Dec. 28, 1965 P. H. SHERRON 3,225,498

TELEPHONE BOOTH CONSTRUCTION

Filed July 12, 1962

2 Sheets-Sheet 1

INVENTOR.

PERCIVAL H. SHERRON

BY

Busser, Smith & Harding

ATTORNEYS

INVENTOR.
PERCIVAL H. SHERRON
BY
Busser, Smith & Harding
ATTORNEYS 3,225,498

TELEPHONE BOOTH CONSTRUCTION

Percival H. Sherron, Jamaica, N.Y. (% Sherron Metallic Corp., 1201 Flushing Ave., Brooklyn 37, N.Y.)

Filed July 12, 1962, Ser. No. 209,462
9 Claims. (Cl. 52—27)

This invention relates to telephone booths of the so-called stall type and more particularly to an improved corner post construction therefor.

It is the general object of this invention to provide a telephone booth construction which is resistant to destruction by vandals. Outdoor telephone booths such as those which are placed at isolated locations are particularly susceptible to destruction by vandals. There is considerable loss of money by telephone companies as a result of vandals who break into the coin boxes of the pay phone assembly or remove the entire pay phone assembly from the telephone booth when burglarizing the booth. Accordingly, it is important to prevent or delay a vandal's attempt to remove or break into the pay phone assembly. This delay may be sufficient to enable detection or apprehension of the vandal.

The telephone booths in accordance with this invention are provided with pay phone mounting means which are fastened in a secure manner to the telephone booth structure so that they cannot be removed easily. Moreover, these mounting means are constructed for use with telephone booths of the attractive slim corner post design.

The above and other objects and features of the invention will become apparent from the following description read in conjunction with the accompanying drawings, in which.

Figure 1:
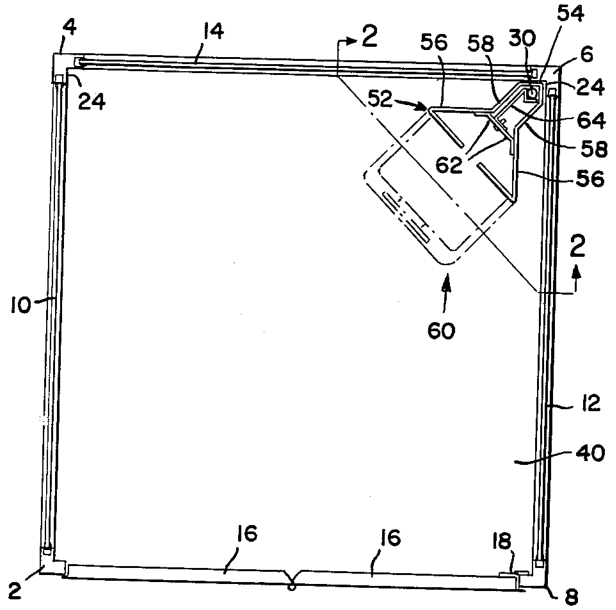
FIGURE 1 is a plan view of a telephone booth in accordance with this invention with the top thereof removed.

The vandal resistant telephone booth in accordance with this invention includes four corner posts 2, 4, 6 and 8 mounted in their lower ends on a rectangular base framework 9 as is well known in the art. The corner posts have vertically extending channels therein adapted to receive the vertical edges of the side and rear panels of the booth for mounting these panels. A side panel 10 is mounted between corner posts 2 and 4, a side panel 12 is mounted between posts 6 and 8 and a rear panel 14 is mounted between the rear corner posts 4 and 6. The panels 10, 12 and 14 generally are constructed at least partially of glass although any type of panel may be used as is well known in the art. A door assembly comprising a pair of centrally hinged door panels 16 is mounted at one vertically extending edge on the corner post 8 by a hinge 18 and extends across the entrance of the telephone booth. The upper ends of the corner posts are secured to a ceiling framework (not shown) in accordance with typical constructions well known in the art to provide a rigid booth structure.

Figure 7:
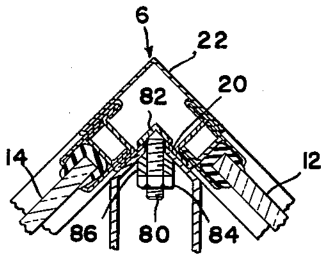
FIGURE 7 is a section taken on line 7—7 of FIGURE 6.

The booth shown in FIGURE 1 is of the type having corner posts constructed with the same relatively slim shape providing an attractive appearance. The corner posts have similar constructions with the front posts 2 and 8 being adapted for cooperation with the door assembly and rear post 6 being adapted to engage the rear and side panels. The corner posts have a hollow construction comprising an inner channel member 20 and an outer channel member 22 adapted to be interlocked at terminal portions thereof as is best illustrated in FIGURE 7. The channel members 20 and 22 cooperate to provide a hollow corner post having a right angular cross-section. The inner channel member 20 of each corner post provides a right angular inner wall 24 at each corner of the telephone booth. This type of corner post construction is well known although wider corner posts have been used in prior constructions.

Figure 3:
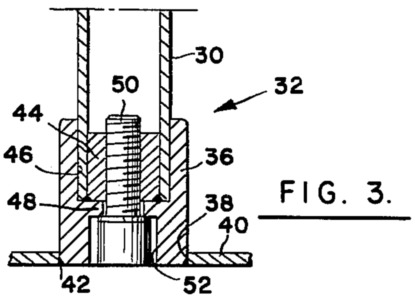
FIGURE 3 is a sectional view of a detail of the corner post shown in FIGURE 2.

Novel means are provided for supporting the pay phone assembly in the corner of the telephone booth adjacent corner post 6. This means comprises a cylindrical pipe 30 which is secured at its lower end in a mounting means 32 at the floor of the booth and is secured at its upper end to a bracket 34 fastened to the corner post 6. The mounting means 32 is shown in detail in FIGURE 3 and comprises a cylindrical member 36 received in a circular opening 38 in the floor plate 40 of the telephone booth. Member 36 is welded at its lower end to the floor plate 40 as is indicated at 42. An annular bushing 44 is contained within pipe 30 at the lower end thereof and is welded thereto. The inner wall of the bushing 44 is threaded. Member 36 is provided with a cylindrical bore 46 adapted to receive the lower end of the pipe 30. An annular shoulder 48 is formed in member 38 at the inner end of bore 46. The pipe 30 is retained in the inserted position shown in FIGURE 3 by a bolt 50 which threadedly engages the threaded inner wall of the bushing 44. Member 36 is provided with a bore 52 adapted to receive the head of the bolt 50. A lock washer is positioned between the bolthead and the annular shoulder 48 when the pipe 30 and mounting means 32 are assembled. During the assembly of pipe 30 in mounting means 32, the bolt 50 is threaded into the bushing 44 until the bolthead presses the lock washer tightly against shoulder 48. It will be apparent that the mounting means 32 provides a sturdy and secure connection between the pipe 30 and the floor of the telephone booth. Moreover, the pipe 30 is fastened securely to the booth structure.

Mounted on the pipe 30 is a backboard assembly which provides a supporting structure for the pay phone assembly. The backboard assembly comprises a member 52 bent in an angular shape, as is best shown in FIGURE 1, and extending vertically an amount equal to the length of a pay phone assembly, this amount being approximately two feet. The member 52 has a right angular portion 54 nested within the inner wall 24 of the corner post 6. The pipe 30 extends vertically through the member 52 at a location adjacent the portion 54. The member 52 has a pair of opposed angular portions 56 spaced from and joined to the portion 54 by a pair of parallel wall portions 58. The terminal legs of angular portions 56 provide a pair of aligned walls adapted to have a pay phone assembly 60 mounted thereon as is illustrated in FIGURE 1. The pay phone assembly 60 projects into the booth from the member 52.

Means are provided for mounting the member 52 on the pipe 30 and this means comprises a bracket 62 extending between and welded to the opposed angular members 56. Bracket 62 extends the entire length of member 52 and serves to provide a rigid connection between the opposed portions of member 52. A bracket 64 is welded at an angular shaped end to the pipe 30 and is bolted at its other end to the bracket 62. Bracket 64 is somewhat shorter than member 52 and may have a length of approximately fifteen inches. The member 52 is provided with two sets of bolt holes so that it may be affixed to bracket 64 in a pair of vertical positions without exposing the bracket 64. The two positions are a standing position which is illustrated by the solid lines in FIGURE 2 and the sitting position illustrated by the dotted lines in this figure.

Figure 2:
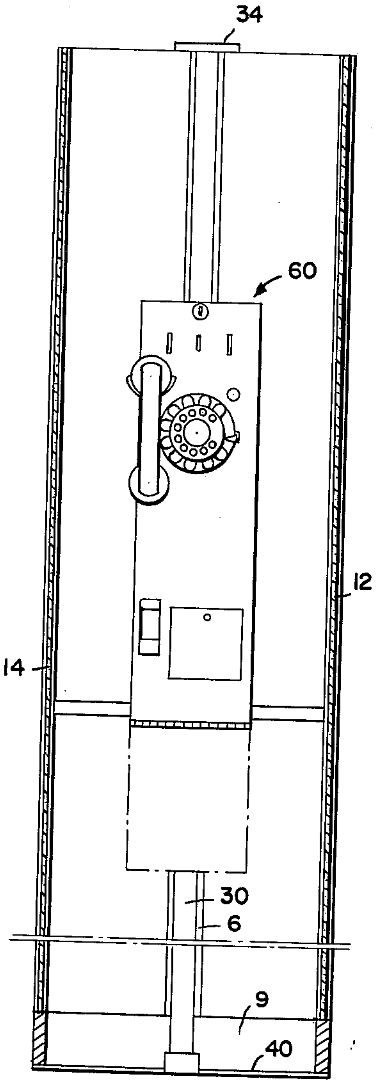
FIGURE 2 is a section taken on line 2—2 of FIGURE 1 and illustrating a corner post in accordance with this invention.

The pay phone assembly that is mounted on bracket 62 may be of the standard type generally in use today or may be of a vandal resistant type more fully disclosed in my copending application Serial No. 200,467, filed June 6, 1962. This vandal resistant type is best illustrated in FIGURE 2 and is constructed so as to enclose many of the parts of the telephone means and thereby hinder access thereto by vandals.

Figure 4:
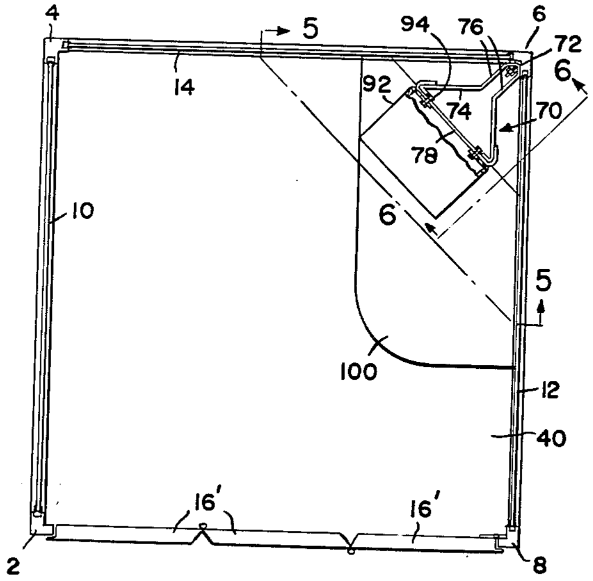
FIGURE 4 is a plan view of another form of telephone booth in accordance with this invention with the top thereof removed.
Figure 5:
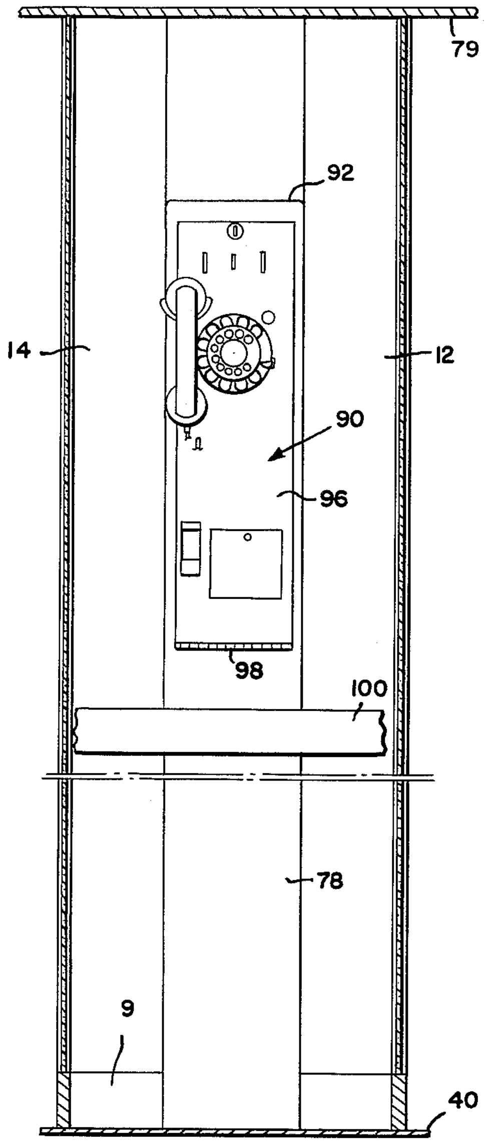
FIGURE 5 is a section taken on line 5—5 of FIGURE 4.
Figure 6:
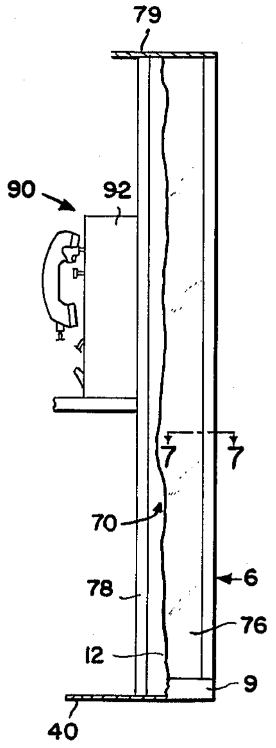
FIGURE 6 is a section taken on line 6—6 of FIGURE 4.

The form of the invention shown in FIGURE 4 comprises a booth structure similar to that shown in FIGURE 1 and having similar corner posts 2, 4, 6 and 8 and panels 10, 12 and 14. The door assembly hinged on corner post 8 comprises three panels 16' and is of a well known construction. In this form of the invention, the mounting means for the pay phone assembly is fastened directly to the corner post 6 in a manner to be described more fully hereafter. It will be apparent that it is essential that this connection to the corner post be very strong and secure so that vandals may not rip the pay phone assembly and its mounting from the corner post.

The mounting for the pay phone assembly comprises a member 70 which is bent in the same shape as the member 52 and comprises a right angular portion 72 at one end and a pair of opposed angular portions 74 at the other end joined to portion 72 by parallel wall portions 76. The angular portions 74 are nested within an angular bracket 78 which is welded thereto to provide a rigid structure. The member 70 and bracket 78 extend vertically from the floor plate 40 to the ceiling structure 79 of the booth so as to have restricted vertical movement.

The means for securing the mounting member 70 to the corner post 6 comprises six fastening members spaced vertically throughout the height of the corner post 6. Each of these fasteners comprises a stud 80 welded to a right angular bracket 82. The bracket 82 is welded to the inner wall 20 of the corner post 6 with the stud 80 projecting through openings in this wall 20 and an aligned opening in portion 72 of member 70 into the interior of the member 70. The member 72 is held in position by a nut 84 which threadedly engages stud 80 and holds a washer 86 tightly against the inner wall of portion 72. The washer 86 has an angular end conforming to the shape of the portion 72 and a flat end abutting the nut 84. Accordingly, as the nut 84 is tightened onto stud 80 the washer 86 is forced tightly against the portion 72 to thereby provide a very rigid and strong mounting.

The pay phone assembly is indicated at 90 and comprises a rectangular cover housing 92 fastened to the front wall of bracket 78 by mounting bolts 94. The cover housing 92 is provided with a front panel 96 on which the pay phone is mounted. Panel 96 is mounted at its lower end on a hinge 98 so as to be pivotable to a horizontal position to present the pay phone to a position accessible to workmen. The panel 96 is normally locked in the vertical position shown in the drawings. The pay phone assembly illustrated in the drawings is constructed for vandal resistance as is more fully described in said copending application. There is provided a suitable shelf 100 beneath the pay phone assembly 90.

In each form of the invention a pay phone mounting means is provided which is fastened in a secure manner to the telephone booth structure so that it cannot be removed easily by unauthorized persons such as vandals. The fastening means are constructed and arranged so that the pay phone mounting means cannot be dislodged easily by merely pulling thereon. Also, the mounting means is constructed so that vertical movement thereof is restricted by the booth structure. Accordingly, vandals cannot rip the pay phone assembly from the telephone booth structure when they attempt to vandalize or burglarize the booth. Furthermore, each of the pay phone mounting means is constructed for use with attractive slim line booths in which very narrow corner posts are used. Moreover, the construction for use with slim corner posts is accomplished without any sacrifice in the strength of the fastening arrangements.

It will be understood that various changes and modifications may be made in the construction and arrangement of parts without departing from the scope of the invention. Accordingly, it is not desired to be limited except as required by the following claims.

What is claimed is:

1. In a telephone booth, the combination comprising a corner post at the rear of the booth having an inner wall facing the interior of the booth, an upright member extending between the ceiling and the floor of the booth, a plurality of fastening means securing said upright member to said inner wall, and backboard means for supporting a pay phone assembly, said backboard means being secured to said upright member and extending between the ceiling and the floor of the telephone booth, said fastening means being vertically spaced throughout the length of said upright member.

2. In a telephone booth, the combination comprising a corner post at the rear of the booth having an inner wall facing the interior of the booth, an upright member extending between the ceiling and the floor of the booth, a plurality of fastening means securing said upright member to said inner wall, and backboard means for supporting a pay phone assembly, said backboard means being secured to said upright member and extending between the ceiling and the floor of the telephone booth, said fastening means being vertically spaced throughout the length of said upright member, each of said fastening means comprising a bolt having a head portion secured to said inner wall, and nut means engaging said bolt and abutting said upright member whereby said upright member is fastened to said corner post.

3. In a telephone booth, the combination comprising a corner post at the rear of the booth having an inner wall facing the interior of the booth, an upright member extending between the ceiling and the floor of the booth and having a pair of spaced opposed leg portions joined by an angular portion, said angular portion being nested within said corner post in contact with said inner wall thereof, a plurality of fastening means securing said upright member to said inner wall, and backboard means for supporting a pay phone assembly, said backboard means being secured to said upright member and extending between the ceiling and the floor of the telephone booth, said fastening means being vertically spaced throughout the length of said upright member.

4. In a telephone booth, the combination comprising a corner post at the rear of the booth having an inner wall facing the interior of the booth, an upright member extending between the ceiling and the floor of the booth and having a pair of spaced opposed leg portions joined by an angular portion, said angular portion being nested within said corner post in contact with said inner wall thereof, a plurality of fastening means securing said upright member to said inner wall, and backboard means for supporting a pay phone assembly, said backboard means being secured to said upright member and extending between the ceiling and the floor of the telephone booth, said fastening means being vertically spaced throughout the length of said upright member, each of said fastening means comprising a bolt having a head portion secured to said inner wall, and nut means engaging said bolt and abutting said angular portion of said upright member whereby said upright member is fastened to said corner post.

5. In a telephone booth, the combination comprising a corner post at the rear of the booth having an inner wall facing the interior of the booth, an upright member extending between the ceiling and the floor of the booth and having a pair of spaced opposed leg portions joined by by angular portion, said angular portion being nested within said corner post in contact with said inner wall thereof, a plurality of fastening means securing said upright member to said inner wall, and backboard means for supporting a pay phone assembly, said backboard means being secured throughout its length to said upright member and extending between the ceiling and the floor of the telephone booth, said leg portions converging inwardly from said backboard means to said angular portion, said fastening means being vertically spaced throughout the length of said upright member.

6. In a telephone booth, the combination comprising a corner post at the rear of the booth having an inner wall facing the interior of the booth, an upright member extending between the ceiling and the floor of the booth adjacent said inner wall of the corner post, means anchoring the bottom of said member to the floor of the booth, means securing the upper end of said upright member in fixed relation to the corner post, backboard means for supporting a pay phone assembly, and means securing said backboard means to said upright member, said backboard means comprising a channel member having a pair of spaced opposed legs joined by an angular portion nested within said inner wall of said corner post and a second portion providing a flat wall, said upright member having a portion defining a threaded opening at the lower end thereof, said anchoring means comprising a mounting member secured to the floor of the booth and having a vertical bore adapted to receive the lower end of said upright member, said mounting member having a shoulder portion at the inner end of said bore, and fastening means threadedly engaging said threaded portion of said upright member, said fastening means extending through said shoulder member and having a portion abutting said shoulder member to prevent upward movement of said fastening member and said upright member engaged therewith.

7. In a telephone booth, the combination comprising a corner post at the rear of the booth having an inner wall facing the interior of the booth, an upright member extending between the ceiling and the floor of the booth adjacent said inner wall of the corner post, means anchoring the bottom of said member to the floor of the booth, means securing the upper end of said upright member in fixed relation to the corner post, backboard means for supporting a pay phone assembly, and means securing said backboard means to said upright member, said backboard means comprising a channel member having a pair of spaced opposed legs joined by an angular portion nested within said inner wall of said corner post and a second portion providing a flat wall, said legs converging inwardly from said flat wall to said angular portion, said inner wall of said corner post having the same width as said angular portion.

8. In a telephone booth, the combination comprising a corner post at the rear of the booth having an inner wall facing the interior of the booth, an upright member extending between the ceiling and the floor of the booth adjacent said inner wall of the corner post, means anchoring the bottom of said member to the floor of the booth, means securing the upper end of said upright member in fixed relation to the corner post, backboard means for supporting a pay phone assembly, means securing said bacboard means to said upright member, said backboard means comprising a channel member having a pair of spaced opposed legs joined by an angular portion nested within said inner wall of said corner post and a second portion providing a flat wall, said upright member extending within said backboard means between said legs and adjacent said angular portion, said securing means including an elongated bracket secured at a vertically extending portion thereof to said upright member and at another vertically extending portion thereof to said backboard means.

9. In a telephone booth, the combination comprising a corner post at the rear of the booth having an inner wall facing the interior of the booth, an upright member extending between the ceiling and the floor of the booth adjacent said inner wall of the corner post, means anchoring the bottom of said member to the floor of the booth, means securing the upper end of said upright member in fixed relation to the corner post, backboard means for supporting a pay phone assembly, means securing said backboard means to said upright member, said upright member having a portion defining a threaded opening at the lower end thereof, said anchoring means comprising a mounting member secured to the floor of the booth, and fastening means mounted in said mounting member and threadedly engaging said threaded portion of said upright member.

References Cited by the Examiner

UNITED STATES PATENTS

| | | | |
|---|---|---|---|
| 1,816,694 | 7/1931 | Pope | 287—20 X |
| 2,215,799 | 9/1940 | Sherron | 20—3.5 X |
| 2,345,705 | 4/1944 | Kuntz | 189—2 |
| 2,349,144 | 5/1944 | Corso | 189—2 |
| 2,647,000 | 7/1953 | Colley | 287—54 |

FRANK L. ABBOTT, *Primary Examiner.*

HENRY C. SUTHERLAND, *Examiner.*